United States Patent [19]
Benjamins, Jr.

[11] 3,990,972
[45] Nov. 9, 1976

[54] APPARATUS FOR THE MONITORING OF FILTERS

[75] Inventor: Lucas Benjamins, Jr., Santpoort, Netherlands

[73] Assignee: Ametek, Inc., New York, N.Y.

[22] Filed: Oct. 15, 1974

[21] Appl. No.: 514,611

[30] Foreign Application Priority Data
Nov. 22, 1973 Germany............................ 2358365
Nov. 22, 1973 Germany...................... 7341790[U]

[52] U.S. Cl. .................................. 210/86; 116/70; 210/91; 210/106
[51] Int. Cl.² ........................................ B01D 37/04
[58] Field of Search................. 116/70, 112, 117 R; 210/86, 90, 91, 106

[56] References Cited
UNITED STATES PATENTS

| | | | |
|---|---|---|---|
| 1,299,996 | 4/1919 | Nicholson.......................... | 210/86 X |
| 2,537,246 | 1/1951 | Thoresen........................... | 210/86 X |
| 2,799,397 | 7/1957 | Berline.............................. | 210/86 X |
| 3,204,766 | 9/1965 | Schmidt, Jr........................... | 210/86 |
| 3,748,263 | 7/1973 | Stöbe................................ | 210/86 X |
| 3,900,289 | 8/1975 | Liston............................... | 73/423 A |

Primary Examiner—Thomas G. Wyse
Assistant Examiner—Robert G. Mukai
Attorney, Agent, or Firm—Smythe & Moore

[57] ABSTRACT

An apparatus for monitoring the thickness of filter cake on a filter by using the difference in pressure between the inside of the filter apparatus and the inside of a hollow body spaced from a filter element to provide a signal of measurement.

2 Claims, 1 Drawing Figure

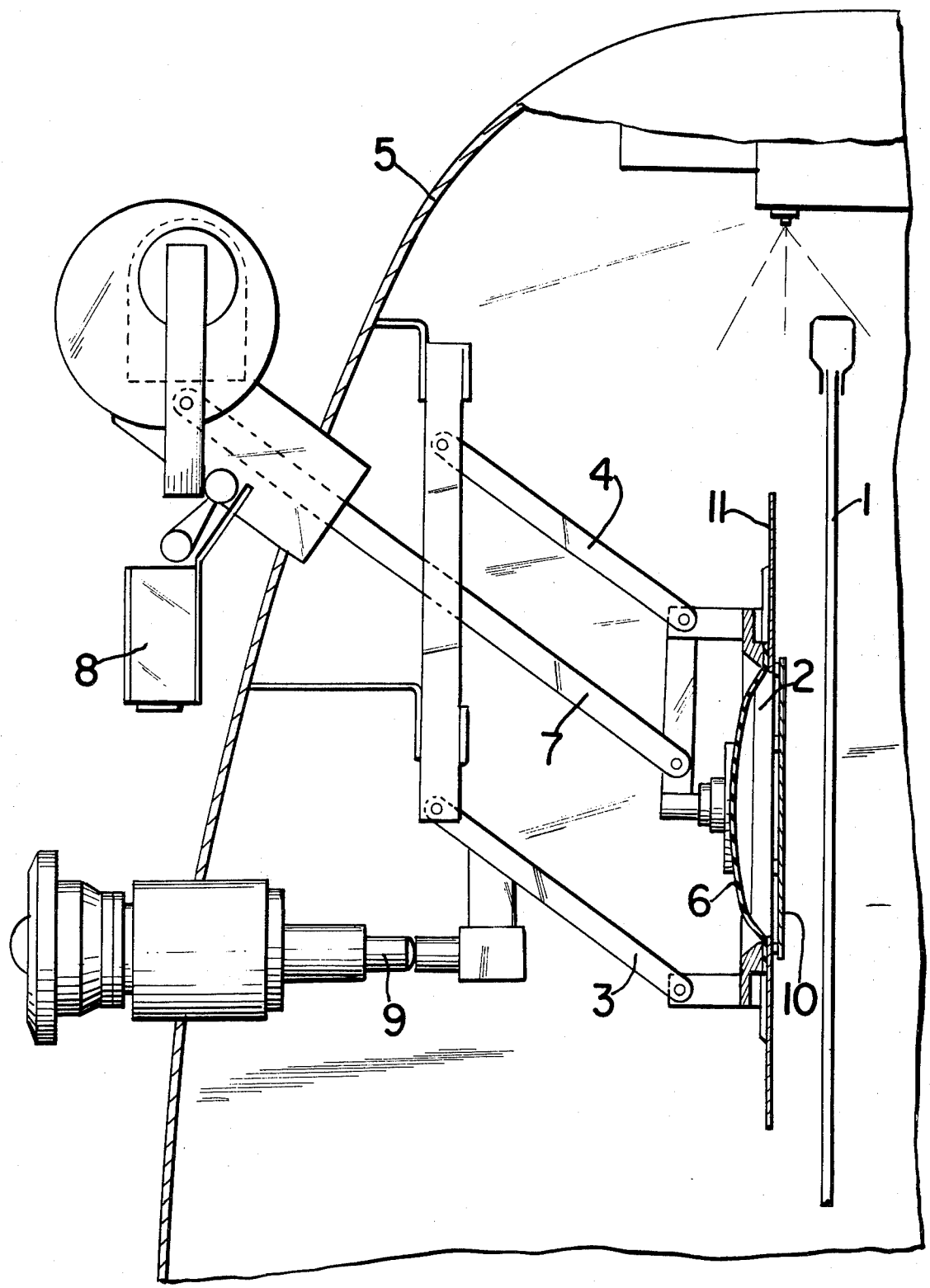

APPARATUS FOR THE MONITORING OF FILTERS

The present invention relates to a process and apparatus for the monitoring of filters with respect to the thickness of the filter cake.

When filtering liquids, a filter cake is formed on the filter elements during the filtration, its thickness increasing up to a certain limit value at which the filtering process must be interrupted in order to remove the filter cake formed on the filter element and make the filtering apparatus ready for the next filtering process. The limit value of the thickness of the filter cake depends on the distance between the filter elements. If the solids content of the liquid to be filtered is known, it can be predicted with relatively high accuracy when the filter cake will have reached its highest permissible thickness, namely, its limit value. When this prerequisite is absent, i.e., the possibility of predicting the thickness of the filter cake, it is necessary to monitor the filtering device with reference to the increase in the thickness of the filter cake.

One of the objects of the present invention is to provide a process and an apparatus of the aforementioned type which are of such a nature that the growth of the filter cake, particularly the reaching of the permissible limit value, is automatically monitored.

Another of the objects of the invention is to provide an arrangement which is simple and uncomplicated with respect to construction and handling.

In order to achieve this purpose, the invention proposes that a hollow body be closed on its open side by the growing filter cake and that the difference in pressure produced thereby between the inside of the hollow body and the space surrounding it be utilized to actuate a switch and/or measuring device.

In this connection, a hollow body, which is preferably trough-shaped or bowl-shaped, may be arranged fixed in position at a distance away from the filter element which corresponds to the limit value of the thickness of the filter cake, the open side of the hollow body facing the filter element, and means provided which control switch and/or measuring devices under the influence of the pressure which acts upon them.

During the filtering process, the hollow body becomes closed from the outside by the filter cake. The pressure difference caused thereby is used, as already mentioned, to actuate certain switching processes, a signal or the like.

The teaching of the invention has the advantage that it can be applied, at least in a large number of cases, subsequently to existing filter devices, since it is merely necessary to apply the hollow body in the region where the actual filtering process takes place. When the hollow body is of approximately trough-like or bowl-like shape, it takes up only a small amount of space. It is furthermore advisable for the means which initiate the processes due to the difference in pressure to be developed as a diaphragm which is arranged on the hollow body or forms the body. There is thus obtained, as a whole, an embodiment which, with suitable selection of the materials, is resistant to practically all fluids to be filtered. The simplicity of the apparatus also results in a correspondingly low susceptibility to disturbances.

Instead of the diaphragm, other means can also be employed. It is furthermore possible to measure the pressure difference between the inside of the hollow body and the space surrounding it by means of a pressure gauge or the like, in which case the pressure gauge is utilized in a known manner to assume the function of the diaphragm and, for example, actuate the switch device of a signal transmitter, control a pump, or the like.

In accordance with a further proposal of the invention, the hollow body can be covered on its open side facing the filter elements by a plate, or the like, in such a manner that only small passageways are left. This embodiment is intended to avoid the formation of channels, passageways, or the like, between the filter cake and the circumferential edge of the hollow body. Such channels or the like can form in particular in the case of high filtering speeds. They have a tendency to influence detrimentally the action of the apparatus, since they may prevent the occurrence of a pressure difference. By the plate-like covering which can be developed, for instance, in the form of a metal sheet, the flow along the circumferential edge of the hollow body is so reduced during the final phase of the increase in the filter cake when the latter starts to close off the open side of the hollow body from the outside that the formation of channels, passageways, or the like, by the washing away of parts of the filter cake is avoided.

The position of the hollow body with respect to the filter element is advantageously adjustable so that it is possible, in case of different limit values of the thickness of the filter cake, to be able properly to adapt the distance between the filter element and hollow body to the prevailing requirements.

In the drawing:

The FIGURE diagramatically shows one apparatus in accordance with the invention.

At a distance from a filter element 1 which corresponds to the limit value of the thickness of the filter cake, there is provided a hollow body 2 of trough or bowl shape which is held by guide rods 3, 4. The latter are arranged on the wall 5 of the filtering vessel.

The central region 6 of the hollow body 2 is elastic and is connected by a further guide rod 7 with a switch device 8.

The distance between the hollow body 2 and the filter element 1 can be adjusted by means of a set screw 9. The latter cooperates with the guide rod 3.

The open side of the hollow body 2 which faces the filter element 1 is closed over the greatest part of open position by a central plate 10 so that for all practical purposes there remains only a narrow passage at the circumferential edge of the plate of the like.

During the course of the growth of the filter cake, the hollow body 2 becomes so closed along its circumferential edge 11 that its inside is sealed off from the outside. As a result, a lower pressure is produced within the hollow body 2 than the pressure prevailing in the filter container, so that the elastic region 6, which forms a centrally arranged diaphragm, moves in the direction towards the filter element 1. This results in a corresponding movement of the guide rod 7, as a result of which the switch device 8 is actuated. The latter can actuate a pump and/or a signal transmitter or other suitable device (not shown in the drawing) in known fashion.

It should be apparent that variation can be made in details of construction without departing from the spirit of the invention except as defined in the appended claims.

What is claimed is:

1. In an apparatus for monitoring a filter apparatus with respect to the thickness of the filter cake, the combination including a filter element, a collapsible diaphragm hollow body having an open side placed at a distance from the filter element corresponding to the limit value of the thickness of the filter cake and with its open side facing the filter element, a solid plate on the open side of said hollow body with circumferential passageway means communicating with the inside of the hollow body, means adjustably mounting said hollow body relative to the filter element, said hollow body being supported on said filter apparatus by opposite parallel links to provide a parallelogram motion so that the open side of said hollow body moves parallel to said filter element as the hollow body is adjustably moved toward and away from said filter element, and signal means operable when the difference in pressure acting on the inside of the hollow body and the inside of the filter apparatus reaches a predetermined value.

2. In an apparatus for monitoring a filter apparatus with respect to the thickness of the filter cake, the combination including a filter element, a collapsible diaphragm hollow body having an open side placed at a distance from the filter element corresponding to the limit value of the thickness of the filter cake and with its open side facing the filter element, signal means operable when the difference in pressure acting on the inside of the hollow body and the inside of the filter apparatus reaches a predetermined value, and adjustable support means for said hollow body, said support means including pivoted links between said hollow body and said filter apparatus, said links providing movement of the open side of said hollow body sideways and parallel relative to said filter element as the hollow body is adjustably moved toward and away from said filter element means, the distance between the pivot points of opposite parallel link means being substantially equal to provide a parallelogram motion, and the signal means being operably connected to a support for the hollow body.

* * * * *